United States Patent
Lin et al.

(10) Patent No.: US 7,151,073 B2
(45) Date of Patent: Dec. 19, 2006

(54) MESOPOROUS CATALYST SUPPORT, A CATALYST SYSTEM, AND METHOD OF MAKING AND USING SAME FOR OLEFIN POLYMERIZATION

(75) Inventors: Zerong Lin, Kingwood, TX (US); David C. Calabro, Princeton Junction, NJ (US); James C. Vartuli, Schwenksville, PA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 356 days.

(21) Appl. No.: 10/758,824

(22) Filed: Jan. 16, 2004

(65) Prior Publication Data

US 2005/0159297 A1    Jul. 21, 2005

(51) Int. Cl.
C08F 4/02      (2006.01)
C08F 4/22      (2006.01)
C08F 4/24      (2006.01)
B01J 21/16     (2006.01)
B01J 23/26     (2006.01)

(52) U.S. Cl. .................. 502/238; 502/240; 502/256; 526/106; 526/130

(58) Field of Classification Search ............... 502/238, 502/240, 256; 526/106, 130
See application file for complete search history.

(56) References Cited

U.S. PATENT DOCUMENTS

| | | | |
|---|---|---|---|
| 2,852,721 A | 9/1958 | Harders et al. | |
| 2,951,816 A | 9/1960 | Hogan | |
| 3,324,095 A | 6/1967 | Carrick et al. | |
| 3,324,101 A | 6/1967 | Baker et al. | |
| 3,474,080 A | 10/1969 | Rekers et al. | |
| 3,484,428 A | 12/1969 | Kallenbach et al. | |
| 3,622,522 A | 11/1971 | Horvath | |
| 3,623,846 A | 11/1971 | Haag et al. | |
| 3,642,749 A | 2/1972 | Johnson et al. | |
| 3,704,287 A | 11/1972 | Johnson et al. | |
| 3,715,321 A | 2/1973 | Horvath et al. | |
| 3,780,011 A | 12/1973 | Pullukat et al. | |
| 3,806,500 A | 4/1974 | Karol et al. | |
| 3,882,096 A | 5/1975 | Shida et al. | |
| 3,985,676 A | 10/1976 | Rekers et al. | |
| 4,143,223 A | 3/1979 | Toyota et al. | |
| 4,220,555 A | 9/1980 | Wristers et al. | |
| 4,224,185 A | 9/1980 | Wristers | |
| 4,359,562 A | 11/1982 | Stein et al. | |
| 4,467,080 A | 8/1984 | Brun et al. | |
| 4,711,710 A | 12/1987 | Chen et al. | |
| 4,914,254 A | 4/1990 | Pelrine | |
| 4,926,004 A | 5/1990 | Pelrine et al. | |
| 4,967,030 A | 10/1990 | Landis et al. | |
| 4,990,718 A | 2/1991 | Pelrine | |
| 4,996,384 A | 2/1991 | Pelrine et al. | |
| 5,015,795 A | 5/1991 | Pelrine | |
| 5,019,670 A | 5/1991 | Lê et al. | |
| 5,057,296 A | 10/1991 | Beck et al. | |
| 5,087,782 A | 2/1992 | Pelrine | |
| 5,105,039 A | 4/1992 | Pelrine | |
| 5,105,051 A | 4/1992 | Pelrine et al. | |
| 5,132,477 A | 7/1992 | Ho et al. | |
| 5,145,816 A | 9/1992 | Beck et al. | |
| 5,146,021 A | 9/1992 | Jackson et al. | |
| 5,171,915 A | 12/1992 | Forbus et al. | |
| 5,189,000 A | 2/1993 | Masi et al. | |
| 5,200,058 A | 4/1993 | Beck et al. | |
| 5,211,934 A | 5/1993 | Kresge et al. | 423/706 |
| 5,220,101 A | 6/1993 | Beck et al. | |
| 5,270,273 A | 12/1993 | Pelrine et al. | |
| 6,096,679 A | 8/2000 | Lonfils et al. | |
| 6,245,869 B1 | 6/2001 | Debras et al. | |
| 6,300,272 B1 | 10/2001 | Bodart | |

FOREIGN PATENT DOCUMENTS

| | | |
|---|---|---|
| EP | 827 969 | 3/1998 |
| EP | 1 205 493 | 5/2002 |
| GB | 1139450 | 1/1969 |
| WO | 00/61645 | 10/2000 |
| WO | 02/40551 | 5/2003 |

OTHER PUBLICATIONS

Kresge et al., "Ordered mesoporous molecular sieves synthesized by a liquid-crystal template mechanism", *Nature*, Oct. 22, 1992, vol. 359, pp. 710-712.

Abstract of EP 0 829 969, published on Mar. 11, 1998, entitled "Chromium catalysts carried on mesoporous molecular sieves".

*Primary Examiner*—Caixia Lu
(74) *Attorney, Agent, or Firm*—Catherine L. Bell

(57) ABSTRACT

This invention relates to a catalyst system comprising a catalyst and a support comprising a non-layered inorganic porous crystalline phase material, wherein the support comprises a hexagonal arrangement of uniformly-sized pores having an average pore diameter greater than or equal to about 13 Å, an X-ray diffraction pattern having a calculated $d_{100}$ value of greater than or equal to about 18 Å, an adsorption capacity of greater than or equal to about 15 grams benzene per 100 grams support at 50 torr and at 25° C., and a pore wall thickness of less then or equal to about 25 Å.

36 Claims, No Drawings

MESOPOROUS CATALYST SUPPORT, A CATALYST SYSTEM, AND METHOD OF MAKING AND USING SAME FOR OLEFIN POLYMERIZATION

FIELD OF THE INVENTION

This invention relates to a catalyst support, a catalyst system, and a method of making and using the catalyst system as well as the polymers and other materials produced thereby.

BACKGROUND OF THE INVENTION

The availability of polyethylene and other polymers derived from polymerization of olefins have revolutionized modern society. Such materials are responsible for innovations, which touch and concern nearly every aspect of modern day life. Polymerization catalysts used in obtaining these materials thus offer opportunities for providing new processes and products to the markets. In particular, supported olefin polymerization catalyst systems are of great interest in making polymeric products available.

Metal containing catalysts may be used in producing polyolefins from alpha-olefins such as ethylene. Polyolefins may be produced by contacting olefins under polymerization conditions with "Ziegler" type catalyst, which may have a Group 4 or 5 transition metal component. A co-catalyst may also be present; see for example U.S. Pat. Nos. 4,224,185, 4,220,555, 4,143,223, 3,623,846, and British Pat. No. 1,139, 450 directed to a co-catalyst comprising titanium, which may be activated with an organometallic compound.

Chromium compounds and complexes may also be used as catalysts for the polymerization of olefins. U.S. Pat. Nos. 3,324,095, 3,324,101, 3,642,749, and 3,704,287 are directed to a catalyst, which includes silyl chromate and polyalicyclic chromate esters. U.S. Pat. Nos. 3,704,287, 3,474,080, and 3,985,676 are directed to phosphorus-containing chromate esters which may also be used in olefin polymerization catalysts. U.S. Pat. No. 4,359,562 is directed to a process of ethylene polymerization using a supported chromium-hydrocarbon complex, and WO2000/61645 is directed to a polymerization catalyst that includes chromium in combination with an organoaluminum material, and an organomagnesium material.

Other chromium catalysts may include: U.S. Pat. Nos. 3,324,101, 3,642,749, 3,704,287, 3,806,500, and 4,467,080, which are directed to chromium compound catalysts in coordination catalyst systems; U.S. Pat. No. 6,300,272 directed to chromium catalyst on a silica support; U.S. Pat. No. 6,245,869 directed to a chromium-based catalyst having a silica and titania support along with a co-catalyst of an aluminum or zinc alkyl; and U.S. Pat. No. 6,096,679 directed to a chromium-based catalyst for the production of polyethylene using a catalyst support of silica, silica-titania, or silica-zirconia.

Catalysts may also be associated with a support. See for example U.S. Pat. Nos. 2,852,721 and 2,951,816, directed to the use of $CrO_3$ supported on an inorganic material that may include silica, alumina or combinations of silica and alumina, and which may be activated by heating in a reducing atmosphere. Combinations of different catalysts on a support may also be used to produce polyolefins, examples include: U.S. Pat. No. 3,882,096 directed to a catalyst and method of preparing ultra high molecular weight polyolefins using chromium oxide on a support in combination with an alkyl ester of titanium; U.S. Pat. No. 3,622,522 directed to an alkoxide of gallium or tin added to supported chromium oxide prior to heat activation; U.S. Pat. No. 3,715,321 directed to adding a compound of a Group 2 or Group 3 metal to supported chromium oxide prior to heat treatment; U.S. Pat. No. 3,780,011 directed to adding alkyl esters of titanium, vanadium or boron; U.S. Pat. No. 3,484,428 directed to adding alkyl boranes to a supported catalyst; and U.S. Pat. No. 5,189,000 directed to using organometallic compound of aluminum with a titanium, vanadium, or chromium catalyst.

Aluminosilicates and other siliceous materials may be used as supports for olefin polymerization catalysts. U.S. Pat. Nos. 5,057,296 and 5,200,058 are directed to a catalyst comprising an active form of a functionalized inorganic, porous, non-layered crystalline phase having uniformly sized pores of at least about 13 Å, and a Group 6 metal. U.S. Pat. Nos. 5,105,051 and 5,270,273 are directed to oligomerizing alpha olefins to produce hydrocarbon oligomers useful as lubricants and lubricant additives using a catalyst comprising a supported reduced Group 6 metal, preferably chromium, in the form of its oxide on a mesoporous, inorganic, crystalline solid having a specific pore geometry described as a uniform hexagonal honeycomb microstructure, with uniform pores having a cell diameter greater than 13 Å. International Application WO2002/4055 1, and EP 827,969 A2 are directed to using mesoporous supports having pore diameters of from 2 to 10 nanometers.

An olefin polymerization process may comprise contacting a catalyst with the olefin at constant temperature and pressure. Upon this contact however, a lag time referred to herein as an induction time may then ensue prior to an appreciable commencement of the polymerization process. This induction time may be monitored by the consumption of the olefin feed stock flowing into the constant pressure reactor. Accordingly, it is beneficial to utilize a catalyst system, which provides a polymer having the desired properties, at the desired rate of conversion, which also provides for a relatively low induction time. However, chromium based catalysts systems may be characterized as having relatively long induction times with relatively low rates of conversion. Accordingly, there remains a need for supported chromium based catalysts having relatively short induction times that provide for relatively high catalytic activities under polymerization conditions, and which produce polymers having desired attributes which may include a particular bulk density, molecular weight distribution, and/or the like. Other references of interest include:

1. U.S. Pat. No. 5,220,101; Sorption separation over modified synthetic mesoporous crystalline material
2. U.S. Pat. No. 5,171,915; Alkylaromatic lubricants from alpha-olefin dimer
3. U.S. Pat. No. 5,146,021; Enhancing compositions and Newtonian lube blends
4. U.S. Pat. No. 5,145,816; Method for functionalizing synthetic mesoporous crystalline material
5. U.S. Pat. No. 5,132,477; Process for producing alkylaromatic lubricant fluids
6. U.S. Pat. No. 5,105,051; Production of olefin oligomer lubricants
7. U.S. Pat. No. 5,105,039; Process for producing lubricant fluids of improved stability
8. U.S. Pat. No. 5,087,782; Dehydrocyclization of polyalpha-olefin lubricants
9. U.S. Pat. No. 5,019,670; Process for producing alkylaromatic lubricant fluids
10. U.S. Pat. No. 5,015,795; Novel synthetic lube composition and process 11. U.S. Pat. No. 4,996,384; Regeneration of reduced metal oxide oligomerization catalyst
12. U.S. Pat. No. 4,990,718; Aromatic alkylation with alpha-olefin dimer
13. U.S. Pat. No. 4,967,030; Hydrocracking high viscosity synthetic lubricant
14. U.S. Pat. No. 4,926,004; Regeneration of reduced supported chromium oxide catalyst for alpha-olefin oligomerization
15. U.S. Pat. No. 4,914,254; Fixed bed process for high viscosity index lubricant
16. U.S. Pat. No. 4,711,710; Process for making improved lubricating oils from heavy feedstock

SUMMARY OF THE INVENTION

This invention relates to a catalyst system comprising a catalyst and a support comprising a non-layered inorganic porous crystalline phase material, wherein the support comprises a hexagonal arrangement of uniformly-sized pores having an average pore diameter greater than or equal to about 13 Å, an X-ray diffraction pattern having a calculated $d_{100}$ value of greater than or equal to about 18 Å, an adsorption capacity of greater than or equal to about 15 grams benzene per 100 grams support at 50 torr and at 25° C., and a pore wall thickness of less then or equal to about 25 Å.

DETAILED DESCRIPTION OF THE INVENTION

This invention relates to a new class of catalytic supports useful to oligomerize and/or polymerize an unsaturated monomer. This invention further relates to a catalyst system comprising the catalytic support, a method of making the catalyst system, and a method of using the catalyst system. This invention also relates to the polymers produced therefrom.

For the purposes of this invention and the claims thereto, when a polymer is referred to as comprising an olefin, the olefin present in the polymer is the polymerized form of the olefin. A catalytically active material may be interchangeably referred to as a catalytic material, or a catalyst. A catalyst system comprises a catalyst and a support. A reactor is any container(s) in which a chemical reaction occurs. In addition, the numbering scheme for the Periodic Table Groups used herein is the "New Notation" as described in CHEMICAL AND ENGINEERING NEWS, 63(5), 27 (1985). Temperatures are listed in degrees Celsius (° C.) unless otherwise noted.

A porous material is a material that adsorbs at least about 1 gram of nitrogen, n-hexane, cyclohexane, or benzene per 100 grams of the material. A porous material or particle having pores in the mesoporous range comprises pores with a diameter at the surface of the particle of greater than or equal to about 20 angstroms (Å) and less than or equal to about 500 Å. Pore size is the a maximum perpendicular cross-sectional pore dimension of the material. Pore wall thickness it the average thickness between pores as measured perpendicular to the pore wall surface. For purposes of this invention, pore wall thickness is determined by multiplying the $d_{100}$ peak value in angstroms by 1.155 and then subtracting the average pore diameter in angstroms (as determined by the BJH adsorption plot of nitrogen adsorption). In the event that the $d_{100}$ is obscured or otherwise unavailable, then the pore wall thickness is determined by multiplying the $d_{200}$ peak value in angstroms by 2.31 and then subtracting the average pore diameter in angstroms (as determined by the BJH adsorption plot of nitrogen adsorption). In the event that the $d_{100}$ and $d_{200}$ peaks are obscured or otherwise unavailable, then the pore wall thickness is determined by multiplying the $d_{300}$ peak value in angstroms by 3.465 and then subtracting the average pore diameter in angstroms (as determined by the BJH adsorption plot of nitrogen adsorption).

Further, for purposes of this invention, Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, a per fluoro radical is an organic radical having one or more available hydrogen atoms substituted with fluorine atoms, EO is an ethylene oxide moiety (i.e., —$CH_2CH_2$—O—), and PO is a propylene oxide moiety (i.e., —$CH_2CH3CH_2$—O—).

Catalyst Support

The catalyst support, also referred to as a catalytic support or simply as a support, is preferably a non-layered inorganic porous crystalline phase material, which comprises a hexagonal arrangement of uniformly sized pores. The crystalline material suitable for use herein may be characterized by its structure, including the size of the pore windows, and by sorption capacity.

The preferred support material is an inorganic material comprising a crystalline phase material. The crystalline phase material has a composition expressed as follows:

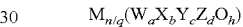

$$M_{n/q}(W_aX_bY_cZ_dO_h)$$

where M is one or more ions, such as ammonium, Group 1, 2 and 17 ions, preferably hydrogen, sodium and/or fluoride ions;

n is the charge of the composition excluding M expressed as oxides;

q is the weighted molar average valence of M;

n/q is the number of moles or mole fraction of M;

W is one or more divalent elements, such as a divalent first row transition metal, e.g. manganese, cobalt, iron, and/or magnesium (for purposes of this invention the symbol W is not meant to indicate the element tungsten);

X is one or more trivalent elements, such as aluminum, boron, iron and/or gallium, with aluminum preferred;

Y is one or more tetravalent elements such as silicon and/or germanium, with silicon preferred;

Z is one or more pentavalent elements, such as phosphorus;

O is oxygen;

a, b, c, and d are mole fractions of W, X, Y and Z, respectively;

h is a number of from 1 to 2.5; and (a+b+c+d)=1.

A preferred embodiment of the above support is when (a+b+c) is greater than d, and h=2. A further embodiment is when a=0, d=0, and h=2, which may include an aluminosilicate. The preferred aluminosilicates have a silica-to-alumina molar ratio of about 5:1 to about 1000:1. Preferably, the support is an aluminosilicate characterized as having an alumina weight percent ($Al_2O_3$ wt %) of about 0.1 to about 20 $Al_2O_3$ wt %, based on the total weight of the support. Within this range, an alumina weight percent of less than or equal to about 15 can be employed, with less than or equal to about 10 $Al_2O_3$ wt % more preferred. Also preferred within this range is weight percent of greater than or equal to about 1, with greater than or equal to about 4 $Al_2O_3$ wt % more preferred. In a preferred embodiment, a and d are 0, h=2, X comprises aluminum, and Y comprises silicon.

Prior to calcination, (in the as-synthesized form), preferred support material preferably has a composition, on an anhydrous basis, expressed empirically as follows:

$$rRM_{n/q}(W_aX_bY_cZ_dO_h);$$

wherein R is the total organic material not included in M as an ion, r is the coefficient for R, i.e. the number of moles or mole fraction of R, where W, X, Y, Z, O, n, q, a, b, c, d, and h are as defined above. The M and R components are associated with the material as a result of their presence during crystallization, and are easily removed or, in the case of M, replaced by post-crystallization methods hereinafter more particularly described. To the extent desired, the original M cations, e.g. sodium or chloride ions of the as-synthesized material can be replaced at least in part, by ion exchange with other ions. Preferred replacing ions include metal ions, hydrogen ions, hydrogen precursors including ammonium ions, and mixtures of ions.

Preferably, the support material is crystalline in that it provides a diffraction pattern with at least one peak by X-ray, electron or neutron diffraction, following calcination. The catalytic support preferably yields an X-ray diffraction pattern with a few distinct maxima in the extreme low angle region. The positions of these peaks preferably approximately fit the positions of the hk0 reflections from a hexagonal lattice. The X-ray diffraction pattern, however, may not always be a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to comprise the present support material.

In its calcined form, the non-layered inorganic porous crystalline phase material may be characterized by an X-ray diffraction pattern with at least one peak at a position greater than about 18 Angstrom Units (Å) d-spacing (4.909 degrees two-theta for Cu K-alpha radiation). More particularly, the calcined crystalline material of the invention may be characterized by an X-ray diffraction pattern with at least two peaks at positions greater than about 10 Å d-spacing (8.842 degrees two-theta for Cu K-alpha radiation), at least one of which is at a position greater than about 18 Å d-spacing, and no peaks at positions less than about 10 Å d-spacing with relative intensity greater than about 20% of the strongest peak. Still more particularly, the X-ray diffraction pattern of the calcined support material will have no peaks at positions less than about 10 Å d-spacing with relative intensity greater than about 10% of the strongest peak.

The calcined non-layered inorganic porous crystalline phase material may be characterized as having a pore size greater than or equal to about 13 Å as measured by physiosorption measurements more particularly set forth herein.

The support may also be characterized based on sorption characteristics. Preferably, the non-layered inorganic porous crystalline phase material has an equilibrium benzene adsorption capacity of greater than about 15 grams benzene/100 grams support at 50 torr and 25° C., based on anhydrous crystal material having been treated to insure no pore blockage by incidental contaminants is present. Accordingly, the sorption tests are conducted on the crystalline material phase having any pore blockage contaminants and water removed. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the non-layered inorganic porous crystalline phase material.

Preferably, the equilibrium benzene adsorption capacity is determined by contacting the anhydrous material of the invention, after oxidative calcination at 450° C.–700° C. for at least one hour, and other treatment, if necessary, to remove any pore blocking contaminants, at 25° C. and 50 torr benzene until equilibrium is reached. The weight of benzene sorbed (i.e., adsorbed) is then determined.

The equilibrium benzene adsorption capacity at 50 torr and 25° C., based on anhydrous crystal material having been treated to insure no pore blockage by incidental contaminants is present, is preferably greater than or equal to about 20 grams benzene/100 grams support, more preferably greater than or equal to about 25 grams benzene/100 grams support.

The equilibrium cyclohexane adsorption capacity at 50 torr and 25° C., based on anhydrous crystal material having been treated to insure no pore blockage by incidental contaminants is present is preferably greater than or equal to about 15 grams cyclohexane/100 grams support, more preferably greater than or equal to about 20 grams cyclohexane/100 grams support, still more preferably greater than or equal to about 25 grams cyclohexane/100 grams support.

The non-layered inorganic porous crystalline phase material may be synthesized with Bronsted acid active sites by incorporating a tetrahedrally coordinated trivalent element, such as Al, Ga, B, or Fe, within the silicate framework. Aluminosilicate materials of this type may be thermally and chemically stable, which are properties favored for acid catalysis. In addition, the mesoporous structures of the support may be utilized by employing highly siliceous materials or crystalline metallosilicate having one or more tetrahedral species having varying degrees of acidity. In addition to aluminosilicates, gallosilicate, ferrosilicate and borosilicate materials may also be employed.

The non-layered inorganic porous crystalline phase material can be prepared from a reaction mixture containing sources of, for example, alkali or alkaline earth metal (M), e.g. sodium or potassium cation, one or a combination of oxides comprising: a divalent element W, e.g. cobalt; a trivalent element X, e.g. aluminum; a tetravalent element Y, e.g. silicon; a pentavalent element Z, e.g. phosphorus; an organic (R) directing agent or agents; and a solvent or solvent mixture with water being preferred. The reaction mixture preferably has a composition, in terms of mole ratios of oxides, within the following ranges:

| Reactants | Preferred Range Greater than or equal to about__ to about __ (Mole ratio of oxides) | More Preferred Range Greater than or equal to about__ to about __ (Mole ratio of oxides) |
|---|---|---|
| $X_2O_3/YO_2$ | 0 to 0.05 | 0.001 to 0.05 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$YO_2$ | 1 to 1500 | 5 to 1000 |
| $OH^-/YO_2$ | 0.01 to 10 | 0.05 to 5 |
| $(M_{2/e}O + R_{2/f}O)/$ $(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0.005 to 5 | wherein e and f are the weighted average valences of M and R, respectively.

In a preferred embodiment X is aluminum and Y is silicon in the above table.

When no Z and/or W oxides are added to the reaction mixture, the pH is preferably maintained at from about 10 to about 14. When Z and/or W oxides are present in the reaction mixture, the pH may vary between about 1 and 14 for crystallization of the non-layered inorganic porous crystalline phase material.

The crystalline support material can be prepared by one of several methods. One preferred method may include a reaction mixture having an $X_2O_3/YO_2$ mole ratio of from 0 to about 0.5, and an $Al_2O_3/SiO_2$ mole ratio of from 0 to 0.01, a crystallization temperature of from about 25° C. to about 250° C., preferably from about 50° C. to about 175° C., and an organic directing agent, or preferably a combination of an organic directing agent with an additional organic directing agent. This preferred method comprises preparing a reaction mixture containing sources of, for example, alkali or alkaline earth metal (M), e.g. sodium or potassium cation, one or a combination of oxides comprising: a divalent element W, e.g. cobalt; a trivalent element X, e.g. aluminum; a tetravalent element Y, e.g. silicon; a pentavalent element Z, e.g. phosphorus; an organic (R) directing agent or agents; and a solvent or solvent mixture such as, for example, $C_1$–$C_6$ alcohols, $C_1$–$C_6$ diols and/or water, with water being preferred. The reaction mixture preferably has a composition, in terms of mole ratios of oxides, within the following ranges:

| Reactants | Preferred Range Greater than or equal to about__ to about __ (Mole ratio of oxides) | More Preferred Range Greater than or equal to about__ to about __ (Mole ratio of oxides) |
| --- | --- | --- |
| $X_2O_3/YO_2$ | 0 to 0.05 | 0.001 to 0.05 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH^-/YO_2$ | 0 to 10 | 0.05 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0.005 to 5 |
| $R_{2/f}O/(YO_2 + WO + Z_2O_5 + X_2O_3)$ | 0.01 to 2.0 | 0.03 to 1.0 | where e and f are the weighted average valences of M and R, respectively.

In this method, when no Z and/or W oxides are added to the reaction mixture, the pH is preferably maintained at from about 9 to about 14. In a preferred embodiment X is aluminum and Y is silicon in the above table.

A second method for synthesis of the crystalline material involves a reaction mixture having an $X_2O_3/YO_2$ mole ratio of from about 0 to about 0.5, a crystallization temperature of from about 25° C. to about 250° C., preferably from about 50° C. to about 175° C., and preferably two separate organic directing agents, i.e. the organic and additional organic directing agents. This preferred method comprises preparing a reaction mixture containing sources of, for example, alkali or alkaline earth metal (M), e.g. sodium or potassium cation, one or a combination of oxides comprising: a divalent element W, e.g. cobalt; a trivalent element X, e.g. aluminum; a tetravalent element Y, e.g. silicon; a pentavalent element Z, e.g. phosphorus; an organic (R) directing agent and an additional directing agents; and a solvent or solvent mixture such as, for example, $C_1$–$C_6$ alcohols, $C_1$–$C_6$ diols and/or water, with water being preferred. The reaction mixture preferably has a composition, in terms of mole ratios of oxides, within the following ranges:

| Reactants | Preferred Range Greater than or equal to about__ to about __ (Mole ratio of oxides) | More Preferred Range Greater than or equal to about__ to about __ (Mole ratio of oxides) |
| --- | --- | --- |
| $X_2O_3/YO_2$ | 0 to 0.05 | 0.001 to 0.05 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH^-/YO_2$ | 0 to 10 | 0.05 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0.005 to 5 |
| $R_{2/f}O/(YO_2 + WO + Z_2O_5 + X_2O_3)$ | 0.1 to 2.0 | 0.12 to 1.0 | where e and f are the weighted average valences of M and R, respectively. In a preferred embodiment X is aluminum and Y is silicon in the above table.

In this second method, when no Z and/or W oxides are added to the reaction mixture, the pH is preferably maintained at from about 9 to about 14.

A third method for synthesis of the crystalline material is where X comprises aluminum and Y comprises silicon, the crystallization temperature is preferably from about 25° C. to about 175° C., preferably from about 50° C. to about 150° C., and an organic directing agent, preferably a combination of an organic directing agent plus an additional organic agent is used. This method comprises preparing a reaction mixture containing sources of, for example, alkali or alkaline earth metal (M), e.g. sodium or potassium cation if desired, one or more sources of aluminum and/or silicon, an organic (R) directing agent, and a solvent or solvent mixture such as, for example $C_1$–$C_6$ alcohols, $C_1$–$C_6$ diols and/or water, with water being preferred. The reaction mixture has a composition, in terms of mole ratios of oxides, within the following ranges:

| Reactants | Preferred Range Greater than or equal to about__ to about __ (Mole ratio of oxides) | More Preferred Range Greater than or equal to about__to about __ (Mole ratio of oxides) |
| --- | --- | --- |
| $Al_2O_3/SiO_2$ | 0 to 0.5 | 0.001 to 0.05 |
| Solvent/$SiO_2$ | 1 to 1500 | 5 to 1000 |
| $OH^-/SiO_2$ | 0 to 10 | 0.05 to 5 |
| $(M_{2/e}O + R_{w/f}O)/(SiO_2 + Al_2O_3)$ | 0.01 to 20 | 0.05 to 5 |
| $M_{2/e}O/(SiO_2 + Al_2O_3)$ | 0 to 5 | 0.005 to 3 |
| $R_{w/f}O/(SiO_2 + Al_2O_3)$ | 0.01 to 2.0 | 0.03 to 1.0 | where e and f are the weighted average valences of M and R, respectively. The pH is preferably maintained at from about 9 to about 14.

Methods 1–3 involves the following steps:
(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) To the primary template mixture of step (1) add the sources of oxides, e.g. silica and/or alumina such that the ratio of $R_{2/f}O/(SiO_{2\ l\ +Al2}O_3)$ is within the range of from about 0.01 to about 2.0.

(3) Agitate the mixture resulting from step (2) at a temperature of from about 20° C. to about 40° C., preferably for about 5 minutes to about 3 hours.

(4) Allow the mixture to stand with or without agitation, preferably at a temperature of from about 20° C. to about 100° C., and preferably for about 10 minutes to about 24 hours.

(5) Crystallize the product from step (4) at a temperature of about 50° C. to about 175° C., preferably for about 1 hour to about 72 hours. Crystallization temperatures higher in the given ranges are more preferred.

A fourth method for the synthesis of the non-layered inorganic porous crystalline phase material involves the reaction mixture used for method three, and also includes the following specific procedure using tetraethylorthosilicate as the source of silicon oxide:

(1) Mix the organic (R) directing agent with the solvent or solvent mixture such that the mole ratio of solvent/$R_{2/f}O$ is within the range of from about 50 to about 800, preferably from about 50 to about 500. This mixture constitutes the "primary template" for the synthesis method.

(2) Mix the primary template mixture of step (1) with tetraethylorthosilicate and a source of aluminum oxide, if desired, such that the $R_{2/f}O/SiO_2$ mole ratio is in the range of from about 0.5 to about 2.0.

(3) Agitate the mixture resulting from step (2) for about 10 minutes to about 6 hours, preferably about 30 minutes to about 2 hours, at a temperature of about 0° C. to about 25° C., and a pH of less than 12. This step permits hydrolysis/polymerization to take place and the resultant mixture may appear cloudy.

(4) Crystallize the product from step (3) at a temperature of about 25° C. to about 150° C., preferably about 95° C. to about 110° C., for about 4 to about 72 hours, preferably about 16 to about 48 hours. Crystallization of the support can be carried out under either static or agitated, e.g. stirred, conditions in a suitable reactor vessel, such as for example, polypropylene jars or Teflon lined or stainless steel autoclaves. The range of temperatures for crystallization is preferably about 50° C. to about 250° C. for a time sufficient for crystallization to occur at the temperature used. Preferred crystallization time's range from about 5 minutes to about 14 days. Thereafter, the crystals are separated from the liquid and recovered.

Non-limiting examples of various combinations of W, X, Y, and Z contemplated for the non-layered inorganic porous crystalline phase material are disclosed in Table 1.

TABLE 1

| Non-Layered Inorganic Porous Crystalline Phase Material Components | | | |
|---|---|---|---|
| Component W | Component X | Component Y | Component Z |
| — | Al | Si | — |
| — | Al | — | P |
| — | — | Si | P |
| Co | Al | — | P |
| Co | Al | Si | P |
| — | — | Si | — |

The compositions may also include the combinations of W comprising Mg or an element selected from the divalent first row transition metals including Mn, Co and Fe; X comprising B, Ga or Fe; and Y comprising Ge.

The preferred organic directing agent for use in synthesizing the non-layered inorganic porous crystalline phase material from the reaction mixture is a quaternary ammonium or phosphonium ion of the formula:

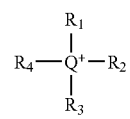

wherein Q is nitrogen or phosphorus and wherein at least one of $R_1$, $R_2$, $R_3$, and/or $R_4$ is aryl or alkyl having from 6 to about 36 carbon atoms, preferably wherein at least one of $R_1$, $R_2$, $R_3$, and/or $R_4$ comprises —$C_6H_{13}$, —$C_{10}H_{21}$, —$C_{16}H_{33}$, —$C_{18}H_{37}$, or combinations comprising at least one of the foregoing. The remainder of $R_1$, $R_2$, $R_3$, and/or $R_4$ preferably comprises hydrogen, alkyl of from 1 to 5 carbon atoms, and combinations comprising at least one of the foregoing. Preferably, the quaternary ammonium or phosphonium ion is derived from the corresponding hydroxide, halide, or silicate.

An additional organic may also be present in the reaction mixture along with the above quaternary ammonium or phosphonium. In one embodiment, an additional organic may be the quaternary ammonium or phosphonium ion of the above directing agent formula wherein $R_1$, $R_2$, $R_3$, and $R_4$ are each independently selected from hydrogen and alkyl of 1 to 5 carbon atoms.

Preferred directing agents include cetyltrimethylammonium, cetyltrimethylphosphonium, octadecyltrimethylammonium, octadecyltrimethylphosphonium, benzyltrimethylammonium, cetylpyridinium, decyltrimethylammonium, dimethyldidodecylammonium, and combinations comprising at least one of the foregoing.

The support may also be produced using a swelling agent, which may include being pillared to provide materials having a large degree of porosity. Examples of swelling agents include clays that may be swollen with water, whereby the layers of the clay are spaced apart by water molecules. Other materials include those which may be swollen with organic swelling agents as described in U.S. Pat. No. 5,057,296, and the like. Organic swelling agents may include amines, quaternary ammonium compounds, alkyl and aromatic swelling agents. Preferred swelling agents include alkyl-substituted aromatics such as 1,3,5-trimethylbenzene, and the like. Examples of non-water swellable layered materials are described in U.S. Pat. No. 4,859,648 and include silicates, magadiite, kenyaite, tritianates and perovskites. Other examples of a non-water swellable layered materials which can be swollen with organic swelling agents include vacancy-containing titanometallate material, as described in U.S. Pat. No. 4,831,006.

Once a material is swollen, the material may be pillared by interposing a thermally stable substance, such as silica, between the spaced apart layers. The aforementioned U.S. Pat. Nos. 4,831,006 and 4,859,648 describe methods for pillaring non-water swellable layered materials described therein, and are incorporated herein by reference for definition of pillaring and pillared materials.

Other patents teaching pillaring of materials and the pillared products include U.S. Pat. Nos. 4,216,188; 4,248,739; 4,176,090; and 4,367,163; and European Patent Application 205,711.

The X-ray diffraction patterns of pillared materials can vary considerably, depending on the degree that swelling and pillaring disrupt the otherwise usually well-ordered microstructure. The regularity of the microstructure in some pillared materials is so badly disrupted that only one peak in the low angle region on the X-ray diffraction pattern is observed, as a d-spacing corresponding to the repeat distance in the pillared material. Less disrupted materials may show several peaks in this region that are generally orders of this fundamental repeat. X-ray reflections from the crystalline structure of the layers are also sometimes observed. The pore size distribution in pillared materials may be narrower than those in amorphous and paracrystalline materials, but may be broader than that in crystalline framework materials.

In producing the support material, the reaction mixture components may be supplied by more than one source and the reaction mixture may be prepared either batch wise or continuously. Furthermore, the non-layered inorganic porous crystalline phase material support can be shaped into a wide variety of particle sizes and include a powder, a granule, or a molded product, such as an extrudate. In cases where the catalyst is molded, such as by extrusion, the crystals can be extruded before drying or partially dried and then extruded.

The particle size of the support is preferably greater than or equal to about 0.1 micrometers. Within this range, a particle size of less than or equal to about 100 micrometers can be employed, with less than or equal to about 50 preferred, and less than or equal to about 10 more preferred. Also preferred within this range is particle size of greater than or equal to about 0.5 micrometers, with greater than or equal to about 0.75 more preferred, and greater than or equal to about 1 micrometer especially preferred.

The non-layered inorganic porous crystalline phase material may also be characterized using techniques that illustrate the microstructure of this material, including transmission electron microscopy and electron diffraction. In determining X-ray diffraction patterns, the X-ray diffraction data is preferably collected using an X-ray diffraction system employing theta-theta geometry, Cu K-alpha radiation, and an energy dispersive X-ray detector such that use of an energy dispersive X-ray detector eliminates the need for incident or diffracted beam monochromators. Both the incident and diffracted X-ray beams are also preferably collimated by double slit incident and diffracted collimation systems. Preferred slit sizes used, starting from the X-ray tube source, include 0.5, 1.0, 0.3 and 0.2 mm, respectively. However, different slit systems may produce differing intensities for the peaks in the X-ray diffraction patterns.

Diffraction data may be recorded using step-scanning at 0.04 degrees of two-theta, where theta is the Bragg angle, and a counting time of 10 seconds for each step is used. The interplanar spacings, d's, may be calculated in Angstrom units (Å), and the relative intensities of the lines, $I/I_o$, where $I_o$ is one-hundredth of the intensity of the strongest line, above background, are preferably derived with the use of a profile fitting routine. Furthermore, the intensities are preferably uncorrected for Lorentz and polarization effects. It should be understood that diffraction data which appears as a single line may consist of multiple overlapping lines which under certain conditions, such as very high experimental resolution or crystallographic changes, may appear as resolved or partially resolved lines. Accordingly, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, peak width/shape variations due to particle size/shape effects, structural disorder, and/or other factors known to those skilled in the art of X-ray diffraction.

Properly oriented specimens of the material preferably show a hexagonal arrangement of large channels and the corresponding electron diffraction pattern gives an approximately hexagonal arrangement of diffraction maxima. As used herein, the $d_{100}$ spacing of the electron diffraction patterns is the distance between adjacent spots on the hk0 projection of the hexagonal lattice and is related to the repeat distance $a_0$ between channels observed in the electron micrographs through the formula $d_{100}=a_0(3/2)^{1/2}$. Accordingly, this $d_{100}$ spacing observed in the electron diffraction patterns corresponds to the d-spacing of a low angle peak in the X-ray diffraction pattern of the material. A preparation of the material may include greater than or equal to 20 to about 40 distinct spots observable in an electron diffraction pattern. These patterns can be indexed with the hexagonal hk0 subset of unique reflections of 100, 110, 200, 210, and the like, and their symmetry-related reflections.

The $d_{100}$ may be directly calculated (i.e., determined) from the measured XRD spectrum, and/or may also be calculated based on one or more peaks in the XRD spectrum. For example, the value of the $d_{100}$ line may be calculated from the $d_{200}$ line based on the formula:

$d_{100}=2(d_{200})=2(a_0(3/2)^{1/2})$.

Accordingly, a calculated $d_{100}$ value may be used in the event that the $d_{100}$ value is not directly discernable from the XRD spectrum. As such, the preferred support has a base configuration consistent in many respects with the compound referred to as MCM-41, a detailed description of which can be found in U.S. Pat. No. 5,098,684.

The non-layered inorganic porous crystalline phase material support may also comprise structural features and attributes of a group of mesoporous crystalline materials as described in U.S. Pat. Nos. 5,198,203 and 5,211,934, to which reference is made for a detailed description of these materials, their preparation and properties. These materials may be distinguished by the characteristic X-ray diffraction pattern of the calcined material. Using $d_1$ to indicate the d-spacings of the strongest peak in the X-ray diffraction pattern (relative intensity=100), the X-ray diffraction pattern of the calcined material exhibits $d_1$ at a position greater than about 18 Å d-spacing and at least one additional weaker peak with d-spacing $d_2$ such that the ratios of these d-spacings relative to $d_1$ (i.e. $d_n/d_1$) correspond to the following ranges:

| d-Spacing $d_n$, Å | $d_n/d_1$ | Relative Intensity |
|---|---|---|
| $d_1$ => ~18 | 1.0 | 100 |
| $d_2$ | 0.87 ± 0.06 | w-m |

More preferably, the X-ray diffraction pattern of the calcined material includes at least two additional weaker peaks at d-spacings $d_2$ and $d_3$ such that the ratios of these d-spacings relative to the strongest peak $d_1$ at a position greater than about 18 Å d-spacing) correspond to the following ranges:

| d-Spacing $d_n$, Å | $d_n/d_1$ | Relative Intensity |
|---|---|---|
| $d_1$ => ~18 | 1.0 | 100 |
| $d_2$ | 0.87 ± 0.06 | w-m |
| $d_3$ | 0.52 ± 0.04 | w |

Still more preferably, the X-ray diffraction pattern of the calcined materials includes at least four additional weaker peaks at d-spacings $d_2$, $d_3$, $d_4$ and $d_5$ such that the ratios of these d-spacings relative to the strongest peak $d_1$ (at a position greater than about 18 Å d-spacing) correspond to the following ranges:

| d-Spacing $d_n$, Å | $d_n/d_1$ | Relative Intensity |
|---|---|---|
| $d_1$ => ~18 | 1.0 | 100 |
| $d_2$ | 0.87 ± 0.06 | w-m |
| $d_3$ | 0.55 ± 0.02 | w |
| $d_4$ | 0.52 ± 0.01 | w |
| $d_5$ | 0.50 ± 0.01 | w |

Calcined materials of this group preferably exhibit an X-ray diffraction pattern including at least two peaks at positions corresponding to the following ranges:

| d-Spacing $d_n$, Å | Relative Intensity |
|---|---|
| 33.0 ± 2.0 | 100 |
| 28.7 ± 1.5 | w |

More preferably, the X-ray diffraction patterns of the calcined examples presented herein can be characterized as including at least three peaks at positions corresponding to the following ranges:

| d-Spacing $d_n$, Å | Relative Intensity |
|---|---|
| 33.0 ± 2.0 | 100 |
| 28.7 ± 1.5 | w |
| 17.2 ± 1.2 | w |

Still more preferably, the X-ray diffraction patterns can be characterized as including at least five peaks at positions corresponding to the following ranges

| d-Spacing $d_n$, Å | Relative Intensity |
|---|---|
| 33.0 ± 2.0 | 100 |
| 28.7 ± 1.5 | w |
| 18.2 ± 0.5 | w |
| 17.2 ± 0.4 | w |
| 16.5 ± 0.3 | w |

The honeycomb microstructure of the non-layered inorganic porous crystalline phase material may also include several moieties interconnected in a three dimensional matrix or lattice having large hexagonal channels forming the ultra large pores of the catalyst. The repeating units forming the large ring structure of the lattice vary with pore size. In addition, a support may comprise 5 to 95 wt. % silica, clay and/or an alumina binder.

The term "hexagonal" is intended to encompass not only materials that exhibit mathematically perfect hexagonal symmetry within the limits of experimental measurement, but also those with significant observable deviations from that ideal state. A working definition as applied to the microstructure of the present invention would be that six nearest neighbor channels at roughly the same distance would surround most channels in the material. However, defects and imperfections may cause significant numbers of channels to violate this criterion to varying degrees, depending on the quality of the material's preparation. Samples which exhibit as much as ±25% random deviation from the average repeat distance between adjacent channels still clearly give recognizable images of the present ultra-large pore materials. Comparable variations are also observed in the $d_{100}$ values from the electron diffraction patterns.

Preferably, the average pore diameter of the non-layered inorganic porous crystalline phase material support may vary from about 20 Å to about 500 Å. Within this range, a pore diameter of less than or equal to about 400 Å can be employed, with less than or equal to about 300 Å more preferred. Also preferred within this range is a pore diameter of greater than or equal to about 70 Å, with greater than or equal to about 150 Å more preferred. In another embodiment the average pore diameter of the support is about 70 Å to about 90 Å.

In a preferred embodiment, the calcined inorganic, non-layered crystalline support material of the present invention may also be characterized as having a more narrowed pore diameter (relative to other forms of the support) of about 70 Å to about 90 Å. Within this range, a pore diameter of less than or equal to about 85 Å can be employed, with less than or equal to about 82 Å more preferred. Also preferred within this range is a pore diameter of greater than or equal to about 75 Å, with greater than or equal to about 80 Å more preferred.

Furthermore, the support material, preferably calcined, of the present invention preferably has a pore wall thickness of less than or equal to about 25 Å. Within this range, a pore wall thickness of less than or equal to about 20 Å can be employed, with less than or equal to about 15 Å more preferred. Also preferred within this range is a pore wall thickness of greater than or equal to about 1 Å, with greater than or equal to about 4 Å more preferred and greater than or equal to about 6 Å especially preferred. In a preferred embodiment the pore wall thickness is from about 1 to 25 Å, preferably, 2 to 25 Å, more preferably 3 to 25 Å, more preferably 4 to 23 Å, more preferably 5 to 20 Å, more preferably 5 to 18 Å, more preferably 6 to 15 Å.

The calcined support material of the non-layered inorganic porous crystalline phase material preferably has a uniformity of pore size, wherein greater than or equal to about 80% of the pores have a pore diameter plus or minus about 20% the average pore diameter of the support; more preferably, greater than or equal to about 90% of the pores present have a pore diameter plus or minus about 5% the average pore diameter of the support.

In a preferred embodiment, at least about 80% of the pores, based on the total number of pores present, have an average pore size greater than or equal to about 70 Å, and less than or equal to about 90 Å. Furthermore, greater than or equal to about 90% of the pores having an average pore size greater than or equal to about 70 Å, and less than or equal to about 90 Å is more preferred, with greater than or equal to about 95% of the pores having an average pore size greater than or equal to about 70 Å, and less than or equal to about 90 Å being especially preferred.

Preferred catalyst systems described herein typically have a surface area greater than or equal to about 300 m²/g support. Preferred calcined inorganic, non-layered crystalline support materials of the present invention are also characterized as having a total surface area greater than or equal to about 300 square meters per gram of support (m²/g support).

Accordingly, the support may be characterized as comprising, after calcination, a substantially hexagonal arrangement of essentially uniform-sized pores. This material exhibits a hexagonal electron diffraction pattern that can be indexed with a $d_{100}$ value greater than about 18 Å.

The support material, especially in its metal, hydrogen and ammonium forms can be beneficially converted to other forms by thermal treatment (calcination). This thermal treatment is generally performed by heating at a temperature of greater than or equal to about 200° C., and less than or equal to about 1000° C. Within this range, a temperature of less than or equal to about 900° C. can be employed, with less than or equal to about 800° C. preferred, and less than or equal to about 750° C. more preferred. Also preferred within this range is a temperature of greater than or equal to about 300° C., with greater than or equal to about 400° C. more preferred, and greater than or equal to about 500° C. especially preferred.

The non-layered inorganic porous crystalline phase material is preferably calcined for at least 1 minute and generally not longer than 20 hours. Within this range, a time of less than or equal to about 15 hours can be employed, with less than or equal to about 10 hours preferred, and less than or equal to about 5 hours more preferred. Also preferred within this range is a time of greater than or equal to about 30 minutes, with greater than or equal to about 1 hour more preferred, and greater than or equal to about 2 hours especially preferred. The non-layered inorganic porous crystalline phase material is preferably calcined in the presence of an oxidizing gas, with oxygen and air being most preferred.

Polymerization Catalyst

The catalyst systems of the present invention comprise a catalyst and a support comprising a non-layered inorganic porous crystalline phase material, preferably calcined at greater than or equal to about 200° C. for greater than or equal to about 1 minute, preferably greater than or equal to 5 minutes, in the presence of an oxidizing gas, wherein the support comprises a hexagonal arrangement of uniformly-sized pores having an average pore diameter greater than or equal to about 13 Å, an X-ray diffraction pattern having a calculated $d_{100}$ value of greater than or equal to about 18 Å, an adsorption capacity of greater than or equal to about 15 grams benzene per 100 grams support at 50 torr and at 25° C., and a pore wall thickness of less then or equal to about 25 Å. In a preferred embodiment the catalyst system is calcined at about 500° C. to about 900° C. for about 0.5 hours (30 minutes) to about 10 hours in the presence of air.

The catalyst preferably comprises a metal or metal containing compound disposed on and/or in the support material. The metal compound is preferably a metal oxide derived from a catalyst precursor comprising a Group 6 metal, more preferably the catalyst comprises chromium (Cr).

The catalyst system preferably comprises about 0.01 to about 10 weight percent catalyst, based on the total weight of the catalyst system. Accordingly, the weight percent of the Cr in the catalyst system can be about 0.01 to about 10 weight percent (wt %), based on the total weight of the catalyst system. Within this range, a Cr wt % of less than or equal to about 5 wt % can be employed, with less than or equal to about 2 wt % preferred, and less than or equal to about 1.5 wt % more preferred. Also preferred within this range is a Cr wt % of greater than or equal to about 0.05 wt %, with greater than or equal to about 0.1 wt % more preferred, and greater than or equal to about 0.15 wt % especially preferred.

The pores of the support are preferably arranged within the support such that a surface of the pores define an inner surface of the support located internal to an outer surface of the support. It is preferred that the catalyst be uniformly arranged throughout the support. More preferably, the concentration of the catalyst disposed or located on the inner surface of the support is greater than a concentration of the catalyst disposed on the outer surface of the support. In other words, the catalyst is preferably disposed and/or located within the pores of the support, as compared to the outer surface of the support particle.

Accordingly, it is preferred that the catalyst be present in the same or a substantially higher concentration "inside" the support than "outside" the support. Inside the support refers to the internal surface area of the support granule. Outside the support refers to the external surface of the support granule. The total surface area refers to both the internal and external surface area of the support.

In a preferred catalyst system, substantially all of the catalyst is substantially evenly dispersed over the total surface area of the support, wherein substantially all refers to at least about 75%, preferably greater than 90% of the catalyst present with the support. In this context, substantially evenly refers to a situation that in any 25 square micron surface or greater of the support, the amount of catalyst present is within 10% of the amount of catalyst present in any other surface area of the same size.

The surface of the calcined non-layered inorganic porous crystalline phase material support over which the catalyst is dispersed necessarily includes the internal surface of the support, i. e. the open-cell mesopores, as well as the external surface. The external surface is preferably smaller than the internal surface. The dispersion will be present on those surfaces of the catalyst, which are accessible to catalyst loading and dispersion techniques. The most preferred catalyst system comprises dispersed catalyst wherein all, or substantially all of the catalyst is located inside the mesopores of the support, rather than on the exterior surface of the support. Accordingly, at least 75% preferably, at least 90%, of the catalyst is present inside the mesopores of the support. Further, the catalyst within the mesopores is substantially evenly dispersed over the total surface area of the support. The location of particles can be inferred from X-ray Photoelectron Spectroscopy (XPS), Low Voltage Scanning Electron Microscopy (LVSEM), High Resolution Analytical Electron Microscopy (AEM) measurements, as well as directly measured by Secondary Ion Mass Spectroscopy (SIMS), all of which are well known to those skilled in the respective arts.

One way to determine the amount of catalyst disposed on the external surface and the internal surface of the support is to measure the ratios of a component of the catalyst to an element in the support, (hereafter "support element") such as silica.

For example, the chromium to support element ratio may be determined by X-ray Photoelectron Spectroscopy (XPS) normalizing to hydrogen and metals. For example, for a support comprising silica, the chromium to silicon ratio could be measured by XPS for the catalyst system (i.e., the supported catalyst), and a crushed, pulverized or otherwise masticated sample of the catalyst system. (The word "crushed" refers to a finely ground solid, such as one that has been ground by mortar and pestal to a fine powder.)

The ratio of the noncrushed (Cr:Si) to crushed (Cr:Si) directly correlates to the ratio of catalyst to silicon outside the support particles over the catalyst to silicon ratio inside the support particles.

By way of example, if the XPS data show the concentration of silicon to be 16.37% and the concentration of chromium to be 8.04% in a first sample that is not crushed, the ratio of chromium to silicon in that sample is 8.04 divided by 16.37 which is 0.491. When the sample is crushed, if the XPS would show 15.68% silicon and 10.29% chromium, the chromium to silicon ratio in the crushed sample is 10.29 divided by 15.68, which is 0.656. In this example, the ratio of chromium outside to chromium inside is then determined by dividing 0.491 by 0.656 to come up with a final ratio of 0.749. For the purposes of this invention it is assumed that the chromium measured in the crushed samples that is from the "external" surface of the support is negligible when included in the total chromium present. Similar XPS data can be generated by methods known in the art for support materials other than silica and should be analyzed in the same manner as the silica example above.

Preferably, the ratio of catalyst to support element outside to catalyst to support element inside should be about 2.0:1 or less, more preferably about 1.5:1 or less, even more preferably about 1.0:1.0, still more preferred is a ratio of 0.85:1.0 or less. In another embodiment the ratio of catalyst to support element outside to catalyst to support element inside should be about 1.75:1 or less, more preferably about 1.25:1 or less, even more preferably about 0.95:1.0, still more preferred is a ratio of 0.85:1.0 or less, still more preferred is a ratio of 0.75:1.0 or less. Accordingly, in a preferred catalyst system, the pores of the support are arranged within the support such that a surface of the pores define an inner surface of the support located internal to an outer surface of the support, and an amount of the catalyst on the inner surface of the support is greater than an amount of the catalyst on the outer surface of the support, as determined by comparing the catalyst concentration on essentially the surface of the catalyst system, with the catalyst concentration of an amount of the catalyst system which has been crushed. Consistent with the support, the average particle size of the catalyst system is preferably greater than or equal to about 0.1 micrometers. Within this range, an average particle size of greater than or equal to about 0.5 micrometers is preferred, with greater than or equal to about 1.0 micrometer more preferred.

Preparation of the Catalyst System

The process to prepare the catalyst system of the present invention preferably includes preparing a solution or slurry comprising a catalyst precursor, and contacting the catalyst precursor solution with an amount of the support, preferably a non-layered inorganic porous crystalline phase material support. The solvent is then preferably removed from the support and the catalyst precursor is then at least partially converted to the catalyst by calcining the combined precursor and support at greater than or equal to about 200° C. for greater than or equal to about 1 minute in the presence of an oxidizing gas to produce the catalyst system.

The catalytic system is preferably activated by oxidation of the catalyst precursor by heating (i.e., calcining) at a temperature of about 500° C. to about 900° C. in the presence of an oxidizing gas, preferably air. The catalyst may then be treated with a reducing agent (i.e., carbon monoxide), at a temperature and for a period of time sufficient to reduce the metal to a lower valence state, and/or the catalyst may be reduced through contact with the monomer to be polymerized during the polymerization process.

The supported metal oxide catalysts are preferably prepared by impregnating a catalyst precursor onto and into a support using water and/or an organic solvent. The support material is preferably at least partially dehydrated and/or calcined prior to deposition of the catalytic precursor. This can be done by heating to a temperature in the range of 200° C. to 900° C. in an atmosphere such as air, nitrogen, or both, at atmospheric, subatmospheric or superatmospheric pressures for a period of time between about 30 minutes and about 48 hours. Dehydration can also be performed at room temperature merely by placing the composition in a vacuum, but a longer time is required to obtain a sufficient amount of dehydration. Preferably the catalyst precursor comprises chromium. Examples of preferred catalyst precursors for a catalyst comprising chromium include chromic acetate, chromic bromide, chromic carbonate, chromic chloride, chromic fluoride, chromic formate, chromic hydroxide, chromic nitrate, chromic oxide, chromic phosphate, chromic potassium sulfate, chromic sulfate, chromium metal, chromium carbonyl, chromium dioxide, chromium picolinate, chromium tetrafluoride, chromium trioxide, chromium acetylacetonate, chromous acetate, chromous bromide, chromous chloride, chromous fluoride, chromous formate, chromous oxalate, chromous sulfate, chromyl chloride, chromyl fluoride, or a combination comprising at least one of the foregoing. Suitable organic solvents depend on the catalyst precursor used, and may include ethanol, methanol, and/or acetic acid.

In a preferred embodiment, the catalyst is contacted with the support using an incipient wetness technique, wherein the solution or slurry comprises a catalyst precursor, preferably comprising chromium, which comprises an amount of solvent less than or equal to about twice the total pore volume of the amount of the support. Preferably the amount of solvent is less than or equal to the total pore volume of support, with an amount of solvent less than the total pore volume of the support being more preferred. The precursor solution is then contacted with an amount of the support, preferably a non-layered inorganic porous crystalline phase material support. The solvent is then preferably removed from the support and the catalyst precursor is then at least partially converted to the catalyst by calcining the combined precursor and support at greater than or equal to about 200° C. for greater than or equal to about 1 minute in the presence of an oxidizing gas to produce the catalyst system.

Monomers

The catalyst systems of this invention may be used to polymerize and/or oligomerize any unsaturated monomer or monomers. Preferred monomers include $C_2$ to $C_{100}$ olefins, more preferably $C_2$ to $C_{60}$ olefins, still more preferably $C_2$ to $C_{40}$ olefins, with preferably $C_2$ to $C_{20}$ olefins still more preferred, and $C_2$ to $C_{12}$ olefins being most preferred. In some embodiments monomers include linear, branched or cyclic alpha-olefins, preferably $C_2$ to $C_{100}$ alpha-olefins, more preferably $C_2$ to $C_{60}$ alpha-olefins, still more preferably $C_2$ to $C_{40}$ alpha-olefins, with $C_2$ to $C_{20}$ alpha-olefins being more preferred, and $C_2$ to $C_{12}$ alpha-olefins most preferred. Examples of preferred olefin monomers include one or more of ethylene, propylene, butene, pentene, hexene, heptene, octene, nonene, decene, dodecene, 4-methyl-pentene-1,3-methyl pentene-1,3,5,5-trimethyl hexene-1, and 5-ethyl-1-nonene.

The polymer produced herein may be a copolymer of one or more linear or branched $C_3$ to $C_{30}$ prochiral alpha-olefins, or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

Preferred monomers may also include aromatic-group-containing monomers containing up to about 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer may further comprise at least one polymerizable double bond such that after polymerization, the aromatic structure will be pendant from the polymer backbone. The aromatic-group containing monomer may further be substituted with one or more hydrocarbyl groups including, but not limited to, $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene, and allyl benzene.

Non-aromatic cyclic group containing monomers are also preferred. These monomers can contain up to about 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane, and the like.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene. Particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins, with or without substituents at various ring positions.

For purposes of this disclosure, the term oligomer refers to compositions having 2-75 mer units and the term polymer refers to compositions having 76 or more mer units. A mer is defined as a unit of an oligomer or polymer that originally corresponded to the olefin(s) used in the oligomerization or polymerization reaction. For example, the mer of polyethylene would be ethylene.

The process described herein may be used to produce an oligomer of any of the monomers listed above. Preferred oligomers include oligomers of any $C_2$ to $C_{20}$ olefins, preferably $C_2$ to $C_{12}$ alpha-olefins, most preferably oligomers comprising ethylene, propylene and or butene are prepared. A preferred feedstock for the oligomerization process is the alpha-olefin, ethylene. Other alpha-olefins, including but not limited to propylene and 1-butene, may also be used alone or combined with ethylene. Preferred alpha-olefins include any $C_2$ to $C_{40}$ alpha-olefin, preferably and $C_2$ to $C_{20}$ alpha-olefin, preferably any $C_2$ to $C_{12}$ alpha-olefin, preferably ethylene, propylene, and butene, most preferably ethylene. Dienes may be used in the processes described herein, preferably alpha, omega-dienes are used alone or in combination with mono-alpha olefins.

The process described herein may be used to produce homopolymers or copolymers. As used herein, a copolymer may comprise two, three, four or more different monomer units. Preferred polymers produced herein include homopolymers or copolymers of any of the above monomers. In a preferred embodiment the polymer is a homopolymer of any $C_2$ to $C_{12}$ alpha-olefin. The polymer may be a homopolymer of ethylene or a homopolymer of propylene. In another embodiment the polymer is a copolymer comprising ethylene and one or more of any of the monomers listed above. In still another embodiment, the polymer is a copolymer comprising propylene and one or more of any of the monomers listed above.

The polymer produced herein may be a copolymer of ethylene and one or more $C_3$ to $C_{20}$ linear, branched or cyclic monomers, preferably one or more $C_3$ to $C_{12}$ linear, branched or cyclic alpha-olefins. Preferably, the polymer produced herein is a copolymer of ethylene and one or more of propylene, butene, pentene, hexene, heptene, octene, nonene, decene, dodecene, 4-methyl-pentene-1,3-methyl pentene-1, and 3,5,5-trimethyl hexene-1.

The polymer produced herein may be a copolymer of propylene and one or more $C_2$ or $C_4$ to $C_{20}$ linear, branched or cyclic monomers, preferably one or more $C_2$ or $C_4$ to $C_{12}$ linear, branched or cyclic alpha-olefins. The polymer produced herein may also be a copolymer of propylene and one or more of ethylene, butene, pentene, hexene, heptene, octene, nonene, decene, dodecene, 4-methyl-pentene-1,3-methylpentene-1, and 3,5,5-trimethyl hexene-1.

The copolymers described herein may comprise at least 50 mole % of a first monomer and up to 50 mole % of other monomers. In another embodiment, the polymer comprises: a first monomer present at from 40 to 95 mole %, preferably 50 to 90 mole %, preferably 60 to 80 mole %; a comonomer present at from 5 to 40 mole %, preferably 10 to 60 mole %, more preferably 20 to 40 mole %; and a termonomer present at from 0 to 10 mole %, more preferably from 0.5 to 5 mole %, more preferably 1 to 3 mole %.

In a preferred embodiment, the first monomer comprises one or more of any $C_2$ to $C_8$ linear branched or cyclic alpha-olefins, including ethylene, propylene, butene, (and all isomers thereof), pentene (and all isomers thereof), hexene (and all isomers thereof), heptene (and all isomers thereof), and octene (and all isomers thereof). Preferred monomers include ethylene, propylene, 1-butene, 1-hexene, 1-octene, cyclohexene, cyclooctene, hexadiene, cyclohexadiene and the like. The comonomer comprises one or more of any $C_2$ to $C_{40}$ linear, branched or cyclic alpha-olefins (provided ethylene, if present, is present at 5 mole % or less), including ethylene, propylene, butene, pentene, hexene, heptene, and octene, nonene, decene, un-decene, do-decene, hexadecene, butadiene, hexadiene, heptadiene, pentadiene, octadiene, nonadiene, decadiene, dodecadiene, styrene, 3,5,5-trimethylhexene-1,3-methylpentene-1,4-methylpentene-1, cyclopentadiene, and cyclohexene. The termonomer comprises one or more of any $C_2$ to $C_{40}$ linear, branched or cyclic alpha-olefins, (provided ethylene, if present, is present at 5 mole % or less), including ethylene, propylene, butene, pentene, hexene, heptene, and octene, nonene, decene, un-decene, do-decene, hexadecene, butadiene, hexadiene, heptadiene, pentadiene, octadiene, nonadiene, decadiene, dodecadiene, styrene, 3,5,5-trimethyl hexene-1,3-methyl-pentene-1,4-methylpentene-1, cyclopentadiene, and cyclohexene.

The polymers described above may further comprise one or more dienes at up to about 10 weight %, preferably at 0.00001 to 1.0 weight %, preferably 0.002 to 0.5 weight %, even more preferably 0.003 to 0.2 weight %, based upon the total weight of the composition. In some embodiments, 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Polymerization Processes

The catalyst compositions described above may be used to oligomerize or polymerize any unsaturated monomer, typically alpha-olefins. One or more catalyst systems as described herein, and one or more monomers are contacted to produce a polymer. Accordingly, a preferred process to polymerize an unsaturated monomer, comprises contacting the monomer with a catalyst system and optionally a scavenger, wherein the catalyst system comprises a catalyst and a support comprising a non-layered inorganic porous crystalline phase material calcined at greater than or equal to about 200° C. for greater than or equal to about 1 minute in the presence of an oxidizing gas, wherein the support comprises a hexagonal arrangement of uniformly-sized pores having an average pore diameter greater than or equal to about 13 Å, an X-ray diffraction pattern having a calculated $d_{100}$ value of greater than or equal to about 18 Å, an adsorption capacity of greater than or equal to about 15 grams benzene per 100 grams support at 50 torr and at 25° C., and a pore wall thickness of less then or equal to about 25 Å.

Preferred scavengers for use herein include triethylaluminum, trimethylaluminum, tri-isobutylaluminum and tri-n-hexylaluminum and diethyl aluminum chloride, dibutyl zinc and the like.

The components may be contacted in a solution, bulk, gas or slurry polymerization process or a combination thereof, preferably gas phase or slurry polymerization process. Thus the present invention further relates to a process to produce polymers from the monomers herein described. The combined catalyst system and monomer are preferably combined in ratios of about 1:1,000,000 to about 10:1.

One or more reactors in series or in parallel may be used in the present invention. The catalyst system is preferably delivered as a slurry or as a powder to the reactor. Polymerizations are carried out in either single reactor operation, in which monomer, comonomers, catalyst, scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors.

The catalytic activity of the catalyst system towards polymerization of ethylene may be determined under polymerization conditions of about 1 liter of isobutane, about 0.25 mmol of dibutylmagnesium, and about 100 mg of catalyst at a total pressure of about 450 psig (3103 KPa) to about 500 psig (3447 KPa), and at a temperature of about 100° C. to about 110° C. Under these conditions, the activity of the catalyst system in g/g/hr is preferably greater than or equal to about 800 g/g/hr for ethylene.

The resultant catalyst system demonstrates improved activity (relative to known catalyst systems) for polymerizing olefins at a temperature range from below room temperature, up to and including about 250° C. Within this range, a temperature of less than or equal to about 200° C. can be employed, with less than or equal to about 150° C. preferred, and less than or equal to about 115° C. more preferred. Also preferred within this range is a temperature of greater than or equal to about 50° C., with greater than or equal to about 70° C. more preferred, and greater than or equal to about 90° C. especially preferred.

The polymerization pressure can be sub atmospheric (i.e., less than 1 atmosphere) to about 5,000 psig (34,474 KPa). Within this range, a pressure of less than or equal to about 1,000 psig (6,895 KPa) can be employed, with less than or equal to about 800 psig (5,516 KPa) preferred, and less than or equal to about 700 psig (4,826 KPa) more preferred. Also preferred within this range is a pressure of greater than or equal to about 100 psig (689 KPa), with greater than or equal to about 200 psig (1,379 KPa) more preferred, and greater than or equal to about 250 psig (1,724 KPa) especially preferred.

The induction time, as used herein, is defined as the period of time between contacting the olefin, the catalyst, and optionally a scavenger under polymerization conditions, and when an appreciable amount of polymer begins to be produced (e.g., a detectable consumption of monomer in the polymerization process also referred to as olefin uptake). Induction time is preferably less than 5 minutes. Preferably, an induction time of less than or equal to about 3 minutes can be employed, with less than or equal to about 2 minutes preferred, and less than or equal to about 1 minute more preferred. Further, the catalyst system used herein may be employed in a batch type reactor, a fixed bed reactor, a slurry reactor, gas phase reactor, and/or in a continuous-flow reactor.

Preferably the induction time between contacting of the monomer with the catalyst system, and the onset of polymerization, is less than or equal to about 2 minutes for ethylene polymerization at about 100° C. to about 110° C., and about 450 psig to about 500 psig.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C. In another embodiment when high-density polyethylene is desired then the reactor temperature is typically between 70 and 105° C.

The productivity of the catalyst or catalyst system in a gas phase system is influenced by the partial pressure of the main monomer. The preferred mole percent of the main monomer, ethylene or propylene, preferably ethylene, is from about 25 to 90 mole percent and the comonomer partial pressure is in the range of from about 138 kPa to about 517 kPa, preferably about 517 kPa to about 2069 kPa, which are typical conditions in a gas phase polymerization process. Also in some systems the presence of comonomer can increase productivity.

In a preferred embodiment, the reactor utilized in the present invention is capable of producing more than 500 lbs of polymer per hour (227 Kg/hr) to about 200,000 lbs/hr (90,900 Kg/hr) or higher, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and preferably greater than 65,000 lbs/hr (29,000 Kg/hr) to greater than 100,000 lbs/hr (45,500 Kg/hr), and most preferably over 100,000 lbs/hr (45,500 Kg/hr).

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421, all of which are herein fully incorporated by reference.

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and optionally comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process should be operated above the reaction diluent critical temperature and pressure. Preferably, a hexane or an isobutane medium is employed.

Useful polymerization techniques include those referred to as particle form polymerization, or slurry process. Such technique are known, and described in for instance, in U.S. Pat. No. 3,248,179, which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

The slurry process may be carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. The reactor is maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low-pressure flash vessel, rotary dryer and a nitrogen purge column in sequence for removal of the isobutane diluent and all unreacted monomer and comonomers. The resulting hydrocarbon free powder is then compounded for use in various applications.

The reactor used in the slurry process of the invention may be capable of producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Using the slurry process of the invention, the total reactor pressure may be in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In the slurry process of the invention, the concentration of predominant monomer in the reactor liquid medium may be in the range of from about 1 to 10 weight percent, preferably from about 2 to about 7 weight percent, more preferably from about 2.5 to about 6 weight percent, most preferably from about 3 to about 6 weight percent.

The process, preferably a slurry or gas phase process may be operated in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT publication WO 96/08520 and U.S. Pat. No. 5,712,352, which are herein fully incorporated by reference. The process described herein may also be run with scavengers.

Bulk or Solution Phase Polymerization

The catalysts described herein can be used advantageously in solution processes (i.e. one where the polymer is soluble in the reaction medium. Generally this involves polymerization in a continuous reactor in which the polymer formed and the starting monomer and catalyst materials supplied, are agitated to reduce or avoid concentration gradients. Suitable processes operate above the melting point of the polymers at high pressures (i.e., from about I to about 3000 bar (10–30,000 MPa)), in which the monomer acts as diluent or in solution polymerization using a solvent.

Temperature control in the reactor is obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 0C and about 160° C., more preferably from about 10° C. to about 140° C., and most preferably from about 40° C. to about 120° C. In series operation, the second reactor temperature is preferably higher than the first reactor temperature. In parallel reactor operation, the temperatures of the two reactors are independent. The pressure can vary from about 1 mm Hg to 2500 bar (25,000 MPa), preferably from 0.1 bar to 1600 bar (1–16,000 MPa), most preferably from 1.0 to 500 bar (10–5000 MPa).

Each of these processes may also be employed in a single reactor, or in a parallel or series reactor configuration. The liquid processes comprise contacting olefin monomers with the above described catalyst system in a suitable diluent or solvent and allowing said monomers to react for a sufficient time to produce the desired polymers. Hydrocarbon solvents are suitable, both aliphatic and aromatic. Alkanes, such as hexane, pentane, isopentane, and octane, are preferred.

The process can be carried out in a continuous stirred tank reactor, batch reactor or plug flow reactor, or more than one reactor operated in series or parallel. These reactors may have or may not have internal cooling and the monomer feed my or may not be refrigerated. See the general disclosure of U.S. Pat. No. 5,001,205 for general process conditions. See also, international application WO 96/33227 and WO 97/22639.

Polymers Produced

The polymers produced herein, particularly the ethylene homopolymers and copolymers, may have a weight average molecular weight (Mw) of 25,000 to 500,000. The polymers produced herein, particularly the ethylene homopolymers and copolymers, may also have a molecular weight distribution (Mw/Mn) of up to 35, more preferably of up to 30 more preferably from 2 to 30, more preferably from 2 to 25.

The polymers produced by this invention are preferably high density polyethylene, defined as polyethylene having a density greater than or equal to about 0.9 grams per cubic centimeter of polymer. Polymerization of ethylene to produce polyethylene having a density of greater than or equal to about 0.94 is preferred, with production of polyethylene having a density greater than or equal to about 0.95 being especially preferred.

Polymers or oligomers produced by this invention may be functionalized. Preferred functional groups include maleic acid and maleic anhydride. By functionalized is meant that the polymer has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. More preferably, the organic compound contains an ethylenic unsaturation conjugated with a carbonyl group (—C=O). Examples include maleic, fumaric, acrylic, methacrylic, itaconic, crotonic, alpha.methyl crotonic, and cinnamic acids as well as their anhydrides, esters and salt derivatives. Maleic anhydride is particularly preferred. The unsaturated acid or anhydride is preferably present at about 0.1 weight % to about 10 weight %, preferably at about 0.5 weight % to about 7 weight %, even more preferably at about 1 to about 4 weight %, based upon the weight of the hydrocarbon resin and the unsaturated acid or anhydride.

EXAMPLES

Example 1

Preparation of 89 Å Support

The synthesis method of this material may be similar to that described by Beck, et. al., JACS, 114(27) (1992), 10832 and in U.S. Pat. No. 5,057,296, Example 41. In particular, a cetyltrimethylammonium hydroxide (CTMAOH) solution is prepared by contacting N,N,N-trimethyl-1-hexadecanaminium chloride solution with a hydroxide-for-halide exchange resin. An amount of sodium aluminate ($NaAlO_2$) was added to the mixture, which is then stirred until the $NaAlO_2$ is completely dissolved. To this solution is added tetramethylammonium (TMA) silicate solution, silica, water, and 1,3,5-trimethylbenzene. The resulting mixture is then stirred at room temperature for several minutes to produce a gel. The gel is then loaded into a stirred autoclave and heated at about 105° C. for about 3 days. The resulting product is filtered and washed several times with warm (60–70° C.) distilled water and with acetone. The support is then calcined to about 538° C. in a $N_2$/air mixture and then held in air for about 10 hours.

The XRD pattern of the resulting material prepared as described above indicated a d-spacing of the $d_{100}$ peak at about 82 Å. Based on the hexagonal indexing of this material, this corresponds to a repeat distance between pores of about 95 Å ($d_{100} \times 2/\sqrt{3}$). The average pore size, taken from the BJH adsorption plot, was about 89 Å. The difference between these two numbers represents a wall thickness of about 6 Å.

Preparation of Catalyst System Using 89 Å Support 0.116 g of $(CH_3CO_2)_7Cr_3(OH)_2$ were dissolved in 4.5 mL of $H_2O$. The solution was added dropwise to 3.00 g of the above 89 Å support. The mixture was well blended and then dried in a vacuum oven at about 70° C. for about 20 hrs. The resulting catalyst precursor was activated in dry air at about 870° C. to afford the polymerization catalyst.

Comparative Example 1

Preparation of 95 Å Support 30 grams of DI $H_2O$, 120 grams of 2M HCl, 4.0 grams of triblock copolymer Pluronic P123 ($EO_{20}PO_{70}EO_{20}$), and 3.0 grams of 1,3,5 trimethylbenzene were combined with mixing. To this mixture 8.5 grams of tetraethylorthosilicate was added and the combined mixture was heated to 35° C. for 20 hours with stirring. The temperature was raised to 100° C. and the stirring was stopped. After 24 hours at 100° C., the mixture was cooled and the sample was filtered and washed with DI H$_2$O. A portion of the material was calcined to 500° C. in air for 3 hours and the resultant calcined material was analyzed. The calcined sample had a pore size of about 95 Å(BJH adsorption plot), surface area of 793 m$^2$/g, and a pore volume of 1.33 g/cc.

The XRD pattern indicated a d-spacing of the d$_{100}$ peak at about 55 Å, representing a repeat distance between pores of about 127Å(2d$_{200}$×2/$\sqrt{3}$) based on the hexagonal indexing of this material. The average pore size taken from the BJH adsorption plot was about 95 Å. The difference between these two values represents a pore wall thickness of about 32 Å.

Preparation of Catalyst System Using 95 Å Support

This catalyst was prepared in a manner similar to that in Example 1 except the above described 95 Å support was used.

Comparative Example 2

Preparation of 62 Å Support 30 grams of DI H$_2$O, 120 grams of 2M HCl, and 4.0 grams of triblock copolymer Pluronic P123 (EO$_{20}$PO$_{70}$EO$_{20}$) was combined with mixing. To this mixture 8.5 grams of tetraethylorthosilicate was added and the combined mixture was heated to 35° C. for 20 hours with stirring. The temperature was raised to 100° C. and the stirring was stopped. After 24 hours at 100° C., the mixture was cooled and the sample was filtered and washed with DI H$_2$O. A portion of the material was calcined to 500° C. in air for 3 hours and the resultant calcined material was analyzed. The calcined sample had a pore size of about 62 Å (BJH adsorption plot), surface area of 820 m$^2$/g, and a pore volume of 0.93 g/cc.

The XRD pattern indicated a d-spacing of the d$_{100}$ peak at about 46 Å, corresponding to a repeat distance between pores of about 106 Å(2×d$_{200}$×2/$\sqrt{3}$), based on the hexagonal indexing of this material. The average pore size taken from the BJH adsorption plot was about 62 Å. The difference between these two values represents a pore wall thickness of about 44 Å.

Preparation of Catalyst System Using 62 Å Support

This catalyst was prepared in a manner similar to that in Example 1 except 3.0 mL of H$_2$O were used to produce the solution and the above described 62 Å support was used.

Comparative Example 3

Preparation of Catalyst system using 969MPI

969MPI is a silica supported chromium catalyst available from W.R. Grace & Co. This catalyst was activated in dry air at 870° C. to afford the polymerization catalyst.

Ethylene Polymerization

Ethylene polymerization was carried out in a 2 L Zipperclave reactor (Autoclave Engineering). First, the reactor was purged under a nitrogen flow for 2 hrs at 120–140° C. Hexane and/or 1-hexene solutions of dibutylmagnesium (DBM), and hydrogen as required were added to 850 mL of isobutane and charged to the reactor. The reactor was then heated to 105–110° C. and pressurized with ethylene to a total pressure of 470 psig (3,241 kPa). 100 mg of catalyst was then charged to the reactor via slurry addition of the remaining 150 mL of isobutane. During polymerization, the reactor temperature was controlled via thermocouples in the reactor and the external jacket. Ethylene was fed on demand to maintain the desired total pressure. The polymerization was terminated after 45 min by removing heat, and venting the volatiles.

Test Methods

I$_2$(g/10 minute) was determined according to ASTM D1238-95, Condition E (2.16 kg, 190° C.).

I$_{21}$(g/10 minute) was determined according to ASTM D1238-95, Condition F (2.16 kg, 190° C.).

Density (g/cm$^3$) was determined according to ASTM D1505-98.

Induction time (minutes) was determined using a stopwatch to measuring the time elapsed between catalyst charged to the reactor, and a detectable onset of ethylene uptake, which was less than or equal to about 0.1 standard liter/minute ethylene flow using a mass flow meter with this particular set-up. Pore size was determined using the BJH adsorption model, see for example Barrett, E. P., Joyner, L. G. and Halenda, P. P., 1951 "The Determination of Pore Volume and Area Distributions in Porous Substances; I. Computations from Nitrogen Isotherms"; J. Amer. Chem. Soc. 73, 373–380.

The examples for ethylene polymerization and copolymerization using the above examples and comparative examples are presented in Table 2, Supported Cr Catalyst For Ethylene Polymerization.

TABLE 2

Supported Cr Catalyst for Ethylene Polymerization

| Run ID | Support Pore size | Al$_2$O$_3$ Wt % | 1-Hexene mL | Hydrogen mmol | Reactor T ° C. | Ind. Time Min | Activity g/g/hr | I$_2$ g/10 min | I$_{21}$ g/10 min | Density g/cm$^3$ |
|---|---|---|---|---|---|---|---|---|---|---|
| Ex. 1 | 89 Å | 4.5 | 0.00 | 0 | 105 | 0 | 1820 | 0.00 | 0.77 | 0.9519 |
| Ex. 1 | 89 Å | 4.5 | 0.75 | 0 | 105 | 1 | 1497 | 0.01 | 2.38 | 0.9504 |
| Ex. 1 | 89 Å | 4.5 | 0.00 | 60 | 105 | 1 | 832 | 0.01 | 5.16 | 0.9557 |
| Ex. 1 | 89 Å | 4.5 | 0.75 | 60 | 105 | 1 | 1037 | 0.00 | 2.76 | 0.9526 |
| Ex. 1 | 89 Å | 4.5 | 0.00 | 0 | 107 | 2 | 1701 | 0.00 | 1.89 | 0.9506 |
| Ex. 1 | 89 Å | 4.5 | 0.75 | 0 | 107 | 1 | 1487 | 0.02 | 4.28 | 0.9469 |
| C-Ex. 1 | 95 Å | 0 | 0.00 | 0 | 105 | 16 | 268 | 0.00 | 0.29 | |
| C-Ex. 1 | 95 Å | 0 | 0.75 | 0 | 105 | 15 | 303 | | | |
| C-Ex. 1 | 95 Å | 0 | 0.00 | 0 | 107 | 10 | 492 | | | |
| C-Ex. 1 | 95 Å | 0 | 0.75 | 0 | 107 | 17 | 350 | 0.00 | 0.21 | |
| C-Ex. 2 | 62 Å | | 0.00 | 0 | 105 | 10 | 83 | | | |
| C-Ex. 2 | 62 Å | 0 | 0.75 | 0 | 105 | 14 | 42 | 0.00 | 0.38 | |
| C-Ex. 2 | 62 Å | 0 | 0.00 | 0 | 107 | — | 104 | | | |
| C-Ex. 2 | 62 Å | 0 | 0.75 | 0 | 107 | 6 | 103 | | | |

TABLE 2-continued

Supported Cr Catalyst for Ethylene Polymerization

| Run ID | Support Pore size | Al$_2$O$_3$ Wt % | 1-Hexene mL | Hydrogen mmol | Reactor T °C. | Ind. Time Min | Activity g/g/hr | I$_2$ g/10 min | I$_{21}$ g/10 min | Density g/cm$^3$ |
|---|---|---|---|---|---|---|---|---|---|---|
| C-Ex. 3 | 969 MPI | 0 | 0.00 | 0 | 105 | 8 | 1188 | 0.05 | 11.98 | 0.9525 |
| C-Ex. 3 | 969 MPI | 0 | 0.75 | 0 | 105 | 7 | 1288 | 0.16 | 19.56 | 0.9490 |
| C-Ex. 3 | 969 MPI | 0 | 0.00 | 60 | 105 | 5 | 1235 | 0.80 | 55.08 | 0.9492 |
| C-Ex. 3 | 969 MPI | 0 | 0.75 | 60 | 105 | 5 | 730 | 0.73 | 64.62 | 0.9497 |
| C-Ex. 3 | 969 MPI | 0 | 0.00 | 0 | 107 | 15 | 949 | 0.19 | 16.13 | 0.9505 |
| C-Ex. 3 | 969 MPI | 0 | 0.75 | 0 | 107 | 10 | 1087 | 0.22 | 20.64 | 0.9470 |

All catalysts were activated at 870° C. Polymerization conditions were: 0.25 mmol DBM in I liter isobutane, 470 psig (3,241 kPa) total pressure, 45 min. run time.

In comparison with commercially available 969MPI (Comparative Example 3) under a variety of conditions, Example 1 using 89 Å support demonstrated lower induction time and higher catalyst activity relative to the Comparative Examples 1, 2, and 3 evaluated. Accordingly, disclosed herein is:

1A. A catalyst system comprising a catalyst and non-layered inorganic porous crystalline phase material, wherein the support comprises a hexagonal arrangement of uniformly-sized pores having an average pore diameter greater than or equal to about 13 Å, an X-ray diffraction pattern having a calculated d$_{100}$ value of greater than or equal to about 18 Å, an adsorption capacity of greater than or equal to about 15 grams benzene per 100 grams support at 50 torr and at 25° C., and a pore wall thickness of less then or equal to about 25 Å.

2A. The catalyst system of 1A above, wherein the support is calcined at greater than or equal to about 200° C. for greater than or equal to about 1 minute in the presence of an oxidizing gas.

3A. The catalyst system of 1A or 2A above, wherein the support is calcined at about 500° C. to about 750° C. for about 0.5 to about 10 hours in air.

4A. The catalyst system of 1A–3A above, wherein greater than or equal to about 80% of the pores have a pore diameter plus or minus about 20% the average pore diameter.

5A. The catalyst system of 1A–4A above, wherein greater than or equal to about 90% of the pores present have a pore diameter plus or minus about 5% the average pore diameter.

6A. The catalyst system of 1A–5A above, wherein the average pore diameter is about 20 Å to about 500 Å.

7A. The catalyst system of 1A–6A above, wherein the average pore diameter is about 70 Å to about 90 Å.

8A. The catalyst system of 1A–7A above having a surface area greater than or equal to about 300 m$^2$/g support.

9A. The catalyst system of 1A–8A above, wherein the pore wall thickness is less than or equal to about 20 Å.

10A. The catalyst system of 1A–9A above, wherein the pore wall thickness is greater than or equal to about 4 Å.

11A. The catalyst system of 1A–10A above, wherein said crystalline phase material has a composition expressed as follows:

$$M_{n/q}(W_aX_bY_cZ_dO_h)$$

where M is one or more ions; n is the charge excluding M expressed as oxides;

q is the weighted molar average valence of M;
n/q is the number of moles or mole fraction of M;
W is one or more divalent elements;
X is one or more trivalent elements;
Y is one or more tetravalent elements;
Z is one or more pentavalent elements;
a, b, c, and d are mole fractions of W, X, Y, and Z, respectively;
h is a number of from 1 to 2.5; and
(a+b+c+d)=1.

12A. The catalyst system of 11A, wherein a and d are 0 and h=2.

13A. The catalyst system of 12A, wherein X comprises aluminum and Y comprises silicon.

14A. The catalyst system of 13A, comprising about 0.1 to about 20 weight percent alumina, based on the total weight of the support.

15A. The catalyst system of 1A–14A above having an average particle size greater than or equal to about 1 micrometer.

16A. The catalyst system of any of 1A to 15A where the system is calcined at greater than or equal to about 200° C. for greater than or equal to about 1 minute in the presence of an oxidizing gas).

17A. The catalyst system of 16A, wherein the catalyst comprises a Group 6 metal.

18A. The catalyst system of 16A–17A above, wherein the catalyst comprises chromium.

19A. The catalyst system of 16A–18A above, wherein the pores of the support are arranged within the support such that a surface of the pores define an inner surface of the support located internal to an outer surface of the support, and wherein an amount of the catalyst on the inner surface of the support is greater than an amount of the catalyst on the outer surface of the support, as determined by comparing the catalyst concentration on essentially the surface of the catalyst system, with the catalyst concentration of an amount of the catalyst system which has been crushed.

20A. The catalyst system of 16A–19A above wherein the support is calcined at about 500° C. to about 750° C. for about 0.5 to about 10 hours in air.

21A. The catalyst system of 16A–20A above, wherein greater than or equal to about 80% of the pores have a pore diameter plus or minus about 20% the average pore diameter.

22A. The catalyst system of 16A–21A above, wherein greater than or equal to about 90% of the pores present have a pore diameter plus or minus about 5% the average pore diameter.

23A. The catalyst system of 16A–22A above, wherein the average pore diameter is about 20 Å to about 500 Å.

24A. The catalyst system of 16A–23A above, wherein the average pore diameter is about 70 Å to about 90 Å.

25A. The catalyst system of 16A–24A above having a surface area greater than or equal to about 300 m²/g support.

26A. The catalyst system of 16A–25A above, wherein the pore wall thickness is less than or equal to about 20 Å.

27A. The catalyst system of 26A, wherein the pore wall thickness is greater than or equal to about 4 Å.

28A. The catalyst system of 16A–27A above, wherein said crystalline phase material has a composition expressed as follows:

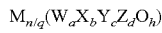

$$M_{n/q}(W_aX_bY_cZ_dO_h)$$

where M is one or more ions; n is the charge excluding M expressed as oxides;
q is the weighted molar average valence of M;
n/q is the number of moles or mole fraction of M;
W is one or more divalent elements;
X is one or more trivalent elements;
Y is one or more tetravalent elements;
Z is one or more pentavalent elements;
a, b, c, and d are mole fractions of W, X, Y, and Z, respectively;
h is a number of from 1 to 2.5; and
(a+b+c+d)=1.

29A. The catalyst system of 28A, wherein a and d are 0 and h=2.

30A. The catalyst system of 29A, wherein X comprises aluminum and Y comprises silicon.

31A. The catalyst system of 30A, comprising about 0.1 to about 20 weight percent alumina, based on the total weight of the support.

32A. The catalyst system of 16A–31A above having an average particle size greater than or equal to about 1 micrometer.

33A. The catalyst system of 16A–32A above, comprising about 0.01 to about 10 weight percent catalyst, based on the total weight of the catalyst system.

34A. A process to prepare the catalyst system of 16A–33A above, comprising contacting a solution comprising a catalyst precursor with an amount of the support, wherein the solution comprises an amount of solvent less than or equal to about twice the total pore volume of the amount of the support;

removing the solvent from the support; and preferably, calcining the support at greater than or equal to about 200° C. for greater than or equal to about 1 minute in the presence of an oxidizing gas to produce the catalyst system.

35A. The process of 34A, wherein the catalyst precursor comprises chromium.

36A. The process of 35A, wherein the catalyst precursor comprises chromic acetate, chromic bromide, chromic carbonate, chromic chloride, chromic fluoride, chromic formate, chromic hydroxide, chromic nitrate, chromic oxide, chromic phosphate, chromic potassium sulfate, chromic sulfate, chromium metal, chromium carbonyl, chromium dioxide, chromium picolinate, chromium tetrafluoride, chromium trioxide, chromium acetylacetonate, chromous acetate, chromous bromide, chromous chloride, chromous fluoride, chromous formate, chromous oxalate, chromous sulfate, chromyl chloride, chromyl fluoride, or a combination comprising at least one of the foregoing.

37A. A process to polymerize an unsaturated monomer, comprising: contacting the monomer with a catalyst system and optionally a scavenger, wherein the catalyst system comprises a catalyst and a support comprising a non-layered inorganic porous crystalline phase material calcined at greater than or equal to about 200° C. for greater than or equal to about 1 minute in the presence of an oxidizing gas, wherein the support comprises a hexagonal arrangement of uniformly-sized pores having an average pore diameter greater than or equal to about 13 Å, an X-ray diffraction pattern having a calculated $d_{100}$ value of greater than or equal to about 18 Å, an adsorption capacity of greater than or equal to about 15 grams benzene per 100 grams support at 50 torr and at 25° C., and a pore wall thickness of less then or equal to about 25 Å.

38A. The process of 37A, wherein an induction time between contacting of the monomer with the catalyst system, and the onset of polymerization, is less than or equal to about 2 minutes for ethylene polymerization at about 100° C. to about 110° C., and about 450 psig to about 500 psig.

39A. The process of 37A–38A above, wherein the catalytic system has an activity of greater than or equal to about 800 g/g/hr for ethylene polymerization, wherein the ethylene polymerization is conducted at about 100° C. to about 110° C., and about 450 psig to about 500 psig.

40A. The process of 37A–39A above, wherein the monomer includes $C_2$–$C_{60}$ olefins, $C_2$–$C_{20}$ alpha olefins, or a combination comprising at least one of the foregoing.

41A. The process of 37A–40A above, carried out under slurry phase polymerization conditions.

42A. The process of 37A–41A above, carried out under gas phase polymerization conditions.

43A. The process of 37A–42A above, carried out under bulk phase polymerization conditions.

44A. The process of 37A–43A above, wherein the catalyst comprises a Group 6 metal.

45A. The process of 37A–44A above, wherein the catalyst comprises chromium.

46A. The process of 37A–45A above, wherein the pores of the support are arranged within the support such that a surface of the pores define an inner surface of the support located internal to an outer surface of the support, and wherein an amount of the catalyst on the inner surface of the support is greater than an amount of the catalyst on the outer surface of the support, as determined by comparing the catalyst concentration on essentially the surface of an amount of the catalyst system, with the catalyst concentration of an amount of the catalyst system which has been crushed.

47A. The process of 37A–46A above, wherein the support is calcined at about 500° C. to about 750° C. for about 0.5 to about 10 hours in air.

48A. The process of 37A–47A above, wherein greater than or equal to about 80% of the pores have a pore diameter plus or minus about 20% the average pore diameter.

49A. The process of 37A–48A above, wherein greater than or equal to about 90% of the pores present have a pore diameter plus or minus about 5% the average pore diameter.

50A. The process of 37A–49A above, wherein the average pore diameter is about 20 Å to about 500 Å.

51A. The process of 37A–50A above, wherein the average pore diameter is about 70 Å to about 90 Å.

52A. The process of 37A–51A above having a surface area greater than or equal to about 300 m²/g support.

53A. The process of 37A–52A above, wherein the pore wall thickness is less than or equal to about 20 Å.

54A. The process of 532A, wherein the pore wall thickness is greater than or equal to about 4 Å.

55A. The process of 37A–54A above, wherein said crystalline phase material has a composition expressed as follows:

$$M_{n/q}(W_aX_bY_cZ_dO_h)$$

where M is one or more ions; n is the charge excluding M expressed as oxides;
q is the weighted molar average valence of M;
n/q is the number of moles or mole fraction of M;
W is one or more divalent elements;
X is one or more trivalent elements;
Y is one or more tetravalent elements;
Z is one or more pentavalent elements;
a, b, c, and d are mole fractions of W, X, Y, and Z, respectively;
h is a number of from 1 to 2.5; and
(a+b+c+d)=1.

56A. The process of 55A, wherein a and d are 0 and h=2.

57A. The process of 56A, wherein X comprises aluminum and Y comprises silicon.

58A. The process of 57A, comprising about 0.1 to about 20 weight percent alumina, based on the total weight of the support.

59A. The process of 37A–58A above having an average particle size greater than or equal to about 1 micrometer.

60A. The process of 37A–59A above, comprising about 0.01 to about 10 weight percent catalyst, based on the total weight of the catalyst system.

61A. The polymer produced according to the process of 37A–60A above, wherein the polymer comprises polyethylene.

62A. The polymer of 61A having a density of greater than or equal to about 0.9 grams per cubic centimeter.

63A. A process to polymerize an unsaturated monomer, comprising:
contacting the monomer with a catalyst system of any of claims of 16A to 33A and optionally a scavenger, wherein the catalyst system comprises a catalyst and a support comprising a non-layered inorganic porous crystalline phase material calcined at greater than or equal to about 200° C. for greater than or equal to about 1 minute in the presence of an oxidizing gas, wherein the support comprises a hexagonal arrangement of uniformly-sized pores having an average pore diameter greater than or equal to about 13 Å, an X-ray diffraction pattern having a calculated $d_{100}$ value of greater than or equal to about 18 Å, an adsorption capacity of greater than or equal to about 15 grams benzene per 100 grams support at 50 torr and at 25° C., and a pore wall thickness of less then or equal to about 25 Å.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A catalyst system comprising an olefin polymerization catalyst and a support comprising a non-layered inorganic porous crystalline phase material, wherein the support comprises a hexagonal arrangement of uniformly-sized pores having an average pore diameter greater than or equal to about 13 Å, an X-ray diffraction pattern having a calculated $d_{100}$ value of greater than or equal to about 18 Å, an adsorption capacity of greater than or equal to about 15 grams benzene per 100 grams support at 50 torr and at 25° C., and a pore wall thickness of less than or equal to about 25 Å.

2. The catalyst system of claim 1, wherein the catalyst system is calcined at greater than or equal to about 200° C. for greater than or equal to about 5 minutes in the presence of an oxidizing gas.

3. The catalyst system of claim 1, wherein the catalyst system is calcined at about 500° C. to about 750° C. for about 30 minutes to about 10 hours in air.

4. The catalyst system of claim 1, wherein greater than or equal to about 80% of the pore have a pore diameter plus or minus about 20% the average pore diameter of the support.

5. The catalyst system of claim 1, wherein greater than or equal to about 90% of the pores present have a pore diameter plus or minus about 5% the average pore diameter of the support.

6. The catalyst system of claim 1, wherein the average pore diameter of the support is about 20 Å to about 500 Å.

7. The catalyst system of claim 1, wherein the average pore diameter of the support is about 70 Å to about 90 Å.

8. The catalyst system of claim 1 having a surface area greater than or equal to about 300 m²/g support.

9. The catalyst system of claim 1, wherein the pore wall thickness is less than or equal to about 20 Å.

10. The catalyst system of claim 9, wherein the pore wall thickness is greater than or equal to about 4 Å.

11. The catalyst system of claim 1, wherein said crystalline phase material has a composition expressed as follows:

$$M_{n/q}(W_aX_bY_cZ_dO_h)$$

where M is one or more ions; ii is the charge excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; O is oxygen; a, b, c, and d are mole fractions of W, X, Y, and Z, respectively; h is a number of from 1 to 2.5; and (a+b+c+d)=1.

12. The catalyst system of claim 11, wherein a and d are 0 and h=2.

13. The catalyst system of claim 12, wherein X comprises aluminum and Y comprises silicon.

14. The catalyst system of claim 13, where the support comprises about 0.1 to about 20 weight percent alumina, based on the total weight of the support.

15. The catalyst system of claim 1 having an average particle size greater than or equal to about 1 micrometer.

16. A catalyst comprising an olefin polymerization catalyst and a support comprising a non-layered inorganic porous crystalline phase material calcined at greater than or equal to about 200° C. for greater than or equal to about 1 minute in the presence of an oxidizing gas, wherein the support comprises a hexagonal arrangement of uniformly-sized pores having an average pore diameter greater than or equal to about 13 Å, an X-ray diffraction pattern having a calculated $d_{100}$ value of greater than or equal to about 18 Å, an adsorption capacity of greater than or equal to about 15 grains benzene per 100 grains support at 50 torr and at 25° C., and a pore wall thickness of less than or equal to about 25 Å.

17. The catalyst system of claim 16, wherein the catalyst comprises a Group 6 metal.

18. The catalyst system of claim 16, wherein the catalyst comprises chromium.

19. The catalyst system of claim 16, wherein the pores of the support are arranged within the support such that a surface of the pores define an inner surface of the support located internal to an outer surface of the support, and wherein an amount of the catalyst on the inner surface of the support is greater than an amount of the catalyst on the outer surface of the support, as determined by comparing the catalyst concentration on essentially the surface of the catalyst system, with the catalyst concentration of an amount of the catalyst system which has been crushed.

20. The catalyst system of claim 16, wherein the catalyst system is calcined at about 5000° C. to about 9003° C. for about 0.5 to about 10 hours in the presence of air.

21. The catalyst system of claim 16, wherein greater than or equal to about 80% of the pores have a pore diameter plus or minus about 20% the average pore diameter of the support.

22. The catalyst system of claim 16, wherein greater than or equal to about 90% of the pores present have a pore diameter plus or minus about 5% the average pore diameter of the support.

23. The catalyst system of claim 16, wherein the average pore diameter of the support is about 20 Å to about 500 Å.

24. The catalyst system of claim 16, wherein the average pore diameter of the support is about 70 Å to about 90 Å.

25. The catalyst system of claim 16 having a surface area greater than or equal to about 300 $m_2$/g support.

26. The catalyst system of claim 16, wherein the pore wall thickness is less than or equal to about 20 Å.

27. The catalyst system of claim 25, wherein the pore wall thickness is greater than or equal to about 4 Å.

28. The catalyst system of claim 16, wherein said crystalline phase material has a composition expressed as follows:

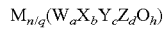

$M_{n/q}(W_a X_b Y_c Z_d O_h)$ where M is one or more ions; n is the charge excluding M expressed as oxides; q is the weighted molar avenge valence of M; n/q is the number of moles or mole fraction of M; W is one or more divalent elements; X is one or more trivalent elements; Y is one or more tetravalent elements; Z is one or more pentavalent elements; O is oxygen; a, b, c, and d are mole fractions of W, X, Y, and Z, respectively; h is a number of from 1 to 2.5; and (a+b+c+d)=1.

29. The catalyst system of claim 28, wherein a and d are 0 and h=2.

30. The catalyst system of claim 29, wherein X comprises aluminum and Y comprises silicon.

31. The catalyst system of claim 30, comprising about 0.1 to about 20 weight percent alumina, based on the total weight of the support.

32. The catalyst system of claim 16 having an average particle size greater than or equal to about 1 micrometer.

33. The catalyst system of claim 16, comprising about 0.01 to about 10 weight percent catalyst, based on the total weight of the catalyst system.

34. A process to prepare the catalyst system of claim 16, comprising contacting a solution comprising a catalyst precursor with an amount of the support, wherein the solution comprises an amount of solvent less than or equal to about twice the total pore volume of the amount of the support; removing the solvent from the support; and calcining the support at greater than or equal to about 200° C. for greater than or equal to about 1 minute in the presence of an oxidizing gas to produce the catalyst system.

35. The process of claim 34, wherein the catalyst precursor comprises chromium.

36. The catalyst system of claim 16, wherein the catalyst precursor comprises chromic acetate, chromic bromide, chromic carbonate, chromic chloride, chromatic fluoride, chromic formate, chromic hydroxide, chromic nitrate, chromic oxide, chromic phosphate, chromic potassium sulfate, chromic sulfate, chromium metal, chromium carbonyl, chromium dioxide, chromium picolinate, chromium tetrafluoride, chromium trioxide, chromium acetylacetonate, chromous acetate, chromous bromide, chromous chloride, chromous fluoride, chromous formate, chromous oxalate, chromous sulfate, chromyl chloride, chromyl fluoride, or a combination comprising at least one of the foregoing.

* * * * *